US012441617B2

United States Patent
Heptia et al.

(10) Patent No.: US 12,441,617 B2
(45) Date of Patent: Oct. 14, 2025

(54) METHOD FOR PURIFICATION OF AT LEAST ONE AQUEOUS SOLUTION OF PHOSPHORIC ACID

(71) Applicant: PRAYON, Engis (BE)

(72) Inventors: Bernard Heptia, Engis (BE); Hubert Halleux, Engis (BE); Damien Gabriel, Engis (BE)

(73) Assignee: PRAYON, Engis (BE)

( * ) Notice: Subject to any disclaimer, the term of this patent is extended or adjusted under 35 U.S.C. 154(b) by 0 days.

(21) Appl. No.: 18/724,077

(22) PCT Filed: Dec. 23, 2022

(86) PCT No.: PCT/EP2022/087733
§ 371 (c)(1),
(2) Date: Jun. 25, 2024

(87) PCT Pub. No.: WO2023/126349
PCT Pub. Date: Jul. 6, 2023

(65) Prior Publication Data
US 2025/0109020 A1    Apr. 3, 2025

(30) Foreign Application Priority Data
Dec. 27, 2021   (BE) .................................. 2021/6073

(51) Int. Cl.
*C01B 25/00*  (2006.01)
*C01B 25/237* (2006.01)

(52) U.S. Cl.
CPC ................. *C01B 25/237* (2013.01)

(58) Field of Classification Search
None
See application file for complete search history.

(56) References Cited

U.S. PATENT DOCUMENTS

| 4,041,134 A | 8/1977 | Kikuchi et al. |
| 4,321,245 A | 3/1982 | Gradl et al. |
| 2016/0332879 A1 | 11/2016 | Lipp |

FOREIGN PATENT DOCUMENTS

CN          110451551 A   *  11/2019

OTHER PUBLICATIONS

CN110451551—English translation (Year: 2019).*

* cited by examiner

*Primary Examiner* — Stefanie J Cohen
(74) *Attorney, Agent, or Firm* — FisherBroyles, LLP; Roger L. Browdy

(57) ABSTRACT

The present invention concerns a method for purifying at least one aqueous solution of phosphoric acid continuously, comprising at least: providing, in at least one vessel, at least one solution AP derived from at least one phosphoric acid obtained by a process for wet-chemical production of phosphoric acid, said solution in said vessel being at a temperature between 65° C. and 98° C., and said solution AP comprising before said step 1: between 50% and 63% by weight of $P_2O_5$ and between 0.1% and 0.5% by weight of $SO_3$; adding barium carbonate to said vessel, said barium carbonate having a specific particle size distribution which allows for effective flow of the barium carbonate while allowing it to have good reactivity.

20 Claims, No Drawings

METHOD FOR PURIFICATION OF AT LEAST ONE AQUEOUS SOLUTION OF PHOSPHORIC ACID

FIELD OF THE INVENTION

The present invention relates to the field of the production of phosphoric acid, and more specifically to the field of the purification of phosphoric acid.

BACKGROUND

Phosphoric acid is a weak acid that may be used in many applications. It may be used, for example, in the food sector or in industrial and pharmaceutical applications, for example as a pH regulator. It may also be used as a raw material in the manufacture of many phosphate salts.

Phosphoric acid is produced from phosphate rock and/or secondary sources of phosphorus such as sewage plant sludge ash and animal ash. Unfortunately, these sources of phosphate often contain numerous impurities that may potentially end up in phosphoric acid. The quantity and nature of the impurities vary depending in particular on the type of process used to produce the phosphoric acid and the raw materials used during said method. For example, in a wet process for production of phosphoric acid in which a phosphate source is attacked with sulphuric acid, the phosphoric acid produced comprises a relatively high level of sulphate.

Depending on the application, the level of purity of phosphoric acid varies greatly. For example, for the high added-value applications, particularly in the food and high-tech sectors, the impurity concentrations must be low. For example, in the case of food applications, the sulphate concentration (expressed as $SO_4$ equivalent) is typically less than 100 ppm while the phosphorus content, expressed as $P_2O_5$ equivalent is typically at least 60% by weight (Phosphoric Acid, Purification, Uses, Technology and Economics, R. Gilmour, CRC Press, 2014, chap 2 Purification of phosphoric Acid, page 77).

There are methods known in the prior art for purifying the phosphoric acid. The document U.S. Pat. No. 4,321,245A discloses a process for purification of wet process phosphoric acid. In this process, barium carbonate is added directly to raw phosphoric acid containing 40-55% by weight $P_2O_5$. The resulting mixture is injected directly into the head of the extraction installation.

However, certain problems have been identified in the prior art methods. Firstly, the flowability of barium carbonate is not always optimal. In fact, when barium carbonate powders are added from a silo, agglomerates may form, impairing the flowability of the barium carbonate. In addition, the reactivity of barium carbonate is not always optimal when barium carbonate granules are used, which may lead to excessively long reaction times and/or over-consumption of barium carbonate. The combination of these problems leads to a reduction of the profitability of the phosphoric acid purification processes. Moreover, for some producers, the existing installations do not always allow the direct implementation of the prior art processes.

There is therefore a continuing need to improve the phosphoric acid purification methods, particularly for the high-value-added applications where the sulphate content must be low and the $P_2O_5$ content must be high, such as the production of phosphoric acid salts and the applications in the food sector. In particular, there is a need for a versatile method for purifying phosphoric acid allowing to avoid the problems associated with the flowability of barium carbonate while allowing an optimum profitability.

SUMMARY OF THE INVENTION

The inventors have surprisingly found that the method described herein allows to provide a solution to the problems identified above. The present invention concerns a method for purifying at least one aqueous solution of phosphoric acid continuously [hereinafter, PA solution] comprising at least the following steps:

step 1: providing, in at least one vessel, at least one PA solution derived from at least one phosphoric acid obtained by a process for wet-chemical production of phosphoric acid, said PA solution in said vessel having a temperature of between 65° C. and 98° C.; said PA solution comprising before said step 1:
  between 50% and 63% by weight of $P_2O_5$ and
  between 0.15% and 0.6% by weight of $SO_3$ relative to the total weight of said PA solution;

step 2: adding barium carbonate to said vessel; said barium carbonate having a particle size distribution such that:
  less than 1% by weight of said barium carbonate passes through a 45 µm mesh sieve;
  between 0% and 2% by weight of said barium carbonate passes through a 63 µm mesh sieve; preferably between 1% and 2% by weight of said barium carbonate passes through a 63 µm mesh sieve;
  between 2 and 11% by weight of said barium carbonate passes through a 250 µm mesh sieve;
  between 25 and 60% by weight, preferably between 30 and 55% by weight of said barium carbonate passes through a 500 µm mesh sieve, more preferably between 30 and 50% by weight of said barium carbonate passes through a 500 µm mesh sieve, even more preferably between 30 and 45% by weight of said barium carbonate passes through a 500 µm mesh sieve;
  at least 85% by weight of said barium carbonate passes through a 1000 µm mesh sieve;

step 3: mixing said barium carbonate and said PA solution in said vessel;

step 4: removing from said vessel said PA solution formed during step 3 after a residence time of said PA solution in said at least one vessel of between 15 and 240 minutes;

step 5: purifying said PA solution removed from said at least one vessel in step 4, by solvent extraction to obtain a purified PA solution.

In a preferred embodiment, said method comprises at least the following steps:

step 1: providing, in at least one vessel, at least one PA solution derived from at least one phosphoric acid obtained by a wet process for phosphoric acid production, said PA solution having a temperature of between 65° C. and 98° C.; said PA solution comprising, before said step 1:
  between 58% and 63% by weight of $P_2O_5$ and
  between 0.15% and 0.6% by weight of $SO_3$ relative to the total weight of said PA solution;

step 2: adding barium carbonate to said vessel; said barium carbonate having a particle size distribution such that:
  less than 1% by weight of said barium carbonate passes through a 45 µm mesh sieve;

between 1 and 2% by weight of said barium carbonate passes through a 63 μm mesh sieve;

between 2 and 11% by weight of said barium carbonate passes through a 250 μm mesh sieve;

between 30 and 45% by weight of said barium carbonate passes through a 500 μm mesh sieve;

at least 85% by weight of said barium carbonate passes through a 1000 μm mesh sieve;

step 3: mixing said barium carbonate and said PA solution in said vessel;

step 4: removing from said vessel said PA solution formed during step 3 after a residence time of said PA solution in said at least one vessel of between 15 and 240 minutes;

step 5: purifying said PA solution removed from said at least one vessel in step 4, by solvent extraction to obtain a purified PA solution.

DETAILED DESCRIPTION

In the context of the present invention, the term "comprising" must not be interpreted as excluding elements other than those explicitly mentioned. It must be interpreted as specifying the presence of the characteristics or steps indicated, but does not exclude the presence or the addition of one or more other characteristics or steps. Thus, the scope of the expression "a method comprising steps A and B" should not be limited to the methods consisting solely of steps A and B. Consequently, the terms "comprising" and "including" encompass the more restrictive terms "consisting essentially of" and "consisting of".

The term "phosphoric acid" is known to the person skilled in the art and has the meaning usually given to it by the person skilled in the art. In particular, the term phosphoric acid refers to a compound with the general formula $HO[P(OH)(O)O]_nH$ with $n \geq 1$. For polyphosphoric acids, $n>1$ and when $n=1$, it is orthophosphoric acid.

More particularly, depending on the concentration of phosphoric acid in an aqueous solution, some of the phosphoric acid may be in the form of polyphosphoric acid ($n \geq 1$) and some may be in the form of orthophosphoric acid ($n=1$). For example, an aqueous solution of phosphoric acid having less than 61% by weight of $P_2O_5$ based on the total weight of said aqueous solution will have a much greater percentage by weight of orthophosphoric acid than the percentage by weight of polyphosphoric acid.

In the context of the present invention, the $SO_3$ contents, in particular in said PA solution, refer to sulphate contents expressed in $SO_3$ equivalents. Unless otherwise stated, these $SO_3$ contents are contents by weight (w/w). The percentage by weight of $SO_3$ may be determined by the method described below.

In the context of this invention, the $P_2O_5$ content refers to phosphoric acid ($H_3PO_4$) content expressed in $P_2O_5$ equivalents. Unless otherwise stated, these $P_2O_5$ contents are contents by weight (w/w). The percentage by weight of $P_2O_5$ may be determined by the method described below.

As mentioned above, the present invention relates to a method for purifying at least one aqueous solution of phosphoric acid [hereinafter PA solution] continuously. The method according to the present invention comprises a step 1 of providing to at least one vessel at least one PA solution derived from at least one phosphoric acid obtained by a wet-process for production of phosphoric acid.

The wet-processes for production of phosphoric acid are known to those persons skilled in the art. Any known wet process for production of phosphoric acid may be used.

According to a preferred embodiment, said PA solution is derived from at least one phosphoric acid obtained by a wet process for production of phosphoric acid. Preferably, said wet process for production of phosphoric acid comprises contacting at least one phosphorus source with at least one acidic aqueous solution, preferably an aqueous sulphuric acid solution. In particular, the processes may be dihydrate, hemihydrate processes or a combination of a dihydrate-hemihydrate process or a process as described in the patents WO2012/163425A1 and/or WO2011067321A1 and/or WO2017220718A1.

In the method according to the present invention, said PA solution has a temperature of between 65° C. and 98° C. In particular, the temperature of said PA solution may be obtained by heating it before said step 1 or during said step 1. Said PA solution may be heated by any standard means known to the person skilled in the art, for example by using a plate heat exchanger or a heating pin or by steam injection (direct or indirect).

Preferably, said PA solution has a temperature of at least 70° C., more preferably at least 80° C.

Preferably, said PA solution has a temperature of at most 90° C., more preferably at most 85° C.

This temperature allows to accelerate the solubilization of barium carbonate and the formation of barium sulphate.

Before said step 1, said PA solution comprises:
between 50% and 63% by weight of $P_2O_5$ and
between 0.15% and 0.6% by weight of $SO_3$ based on the total weight of said PA solution.

The relatively high weight percentage of $P_2O_5$ prior to said step 1 may be the result of other purification and concentration steps known to the person skilled in the art and not explicitly mentioned taking place prior to said step 1. A high percentage of $P_2O_5$ prior to step 1 comprises advantages. This allows to increase the overall yield of the process of the invention.

Preferably, before said step 1, said PA solution comprises at least 52% by weight of $P_2O_5$, preferably at least 54% by weight of $P_2O_5$, more preferably at least 56% by weight of $P_2O_5$, more preferably at least 58% by weight of $P_2O_5$, more preferably at least 59% by weight of $P_2O_5$, based on the total weight of said PA solution.

Preferably, before said step 1, said PA solution comprises at most 62% by weight of $P_2O_5$, preferably at most 61% by weight of $P_2O_5$, more preferably at most 60% by weight of $P_2O_5$ based on the total weight of said PA solution.

In one embodiment, said PA solution comprises, before said step 1, at least 52% by weight and at most 62% by weight, preferably at least 54% by weight and at most 61% by weight, more preferably at least 56% by weight and at most 61% by weight, even more preferably at least 58% by weight and at most 61% by weight, even more preferably at least 59% by weight and at most 60% by weight of $P_2O_5$, relative to the total weight of said PA solution.

Preferably, said PA solution comprises before said step 1 between 0.20% and 0.60% by weight of $SO_3$, more preferably between 0.20% and 0.50% by weight of $SO_3$ relative to the total weight of said PA solution before said step 1.

During step 2 of said method according to the invention, barium carbonate is added to said PA solution.

It has been observed that the barium carbonate added in step 2 reacts with the sulphate present in said PA solution to form a barium sulphate precipitate which forms low-hardness incrustations that are easily removed in the installations used to implement the method according to the invention. Barium sulphate incrustations may then be easily cleaned, for example using pressurized water. These barium sulphate incrustations are easier to clean than calcium sulphate incrustations that would have been obtained by adding $CaCO_3$ to the PA solution instead of $BaCO_3$. Consequently, the use of barium carbonate in step 2 allows, among other things, to shorten the cleaning times and therefore improve the cost-effectiveness of the method according to the invention.

Barium carbonate may be added to said PA solution in any way known to the person skilled in the art and suitable for a continuous process.

Preferably, said barium carbonate is added at said step 2 and said PA solution is provided at said step 1 by means of a coaxial conduit. Preferably, said coaxial conduit comprises an internal conduit and an external conduit. Preferably, said barium carbonate is added to said PA solution through said internal conduit and at least one portion of said PA solution is provided to said at least one vessel through said external conduit. At least some of said PA solution may be added by other means. Preferably, said barium carbonate is added at said step 2 and said PA solution is provided at said step 1 simultaneously and continuously.

Surprisingly, it has been found that the joint use of barium carbonate having the particle size as defined below and of the coaxial conduit for providing said PA solution into said at least one vessel and for adding said barium carbonate and said PA solution, allows, inter alia, to avoid the losses of barium carbonate in the degassing of the vessels and consequently the over-consumption of barium carbonate during the purification method.

Said barium carbonate added in said step 2 has a particle size distribution such that:
- less than 1% by weight of said barium carbonate passes through a 45 µm mesh sieve;
- between 0% and 2% by weight of said barium carbonate passes through a 63 µm mesh sieve; preferably between 1% and 2% by weight of said barium carbonate passes through a 63 µm mesh sieve;
- between 2 and 11% by weight of said barium carbonate passes through a 250 µm mesh sieve;
- between 25 and 60% by weight of said barium carbonate passes through a 500 µm mesh sieve, preferably between 30 and 55% by weight of said barium carbonate passes through a 500 µm mesh sieve, more preferably between 30 and 50% by weight of said barium carbonate passes through a 500 µm mesh sieve, even more preferably, between 30 and 45% by weight of said barium carbonate passes through a 500 µm mesh sieve;
- at least 85% by weight of said barium carbonate passes through a 1000 µm mesh sieve, preferably a 900 µm mesh sieve.

The particle size of the barium carbonate may be determined by any sieving technique known to the person skilled in the art, for example, the standards DIN4188 or DIN 1171 standards or Afnor X11520. In particular, a mechanical sieving may be used. In practice a defined quantity of barium carbonate (e.g., 100 g) is sieved on a vibrating sieve for 20 min with different sieve mesh diameters (e.g., with mesh sizes (in µm) of 45, 63, 250, 500, 1000, etc.); the rejects collected on each sieve are weighed on a precision balance and converted into percentages by weight for each mesh diameter relative to the total weight of barium carbonate.

The inventors found that, surprisingly, such a particle size of the barium carbonate allow to confer it both a good flowability and a good reactivity with the sulphate present in said PA solution. The improved flowability is due, among other things, to the fact that said particle size allows to prevent or minimize the formation of agglomerates in the silos used to store said barium carbonate in said PA solution. The presence of agglomerates in the silo prevents an optimum flow of the barium carbonate from the silo to the system for extracting the barium carbonate from the silo (e.g., silo extraction screw, extraction conduit, dosing system, etc.) which will feed, for example, a coaxial conduit allowing the barium to be added to said PA solution. The improved reactivity means, among other things, that excess barium carbonate does not need to be added to said PA solution. The flowability is determined by the Flodex™ index as described below.

In particular, the particle size of the barium carbonate added in step 2 allows the barium carbonate to have a Flodex index measured according to the method described below of at most 15, preferably at most 10, more preferably about 5.

The fluidity of the flow may also be measured by determining the angle of repose as described below. The smaller the angle of repose, the more fluid the barium carbonate will flow. In particular, the particle size of the barium carbonate added in step 2 allows the barium carbonate to have an angle of repose measured according to the method described below of at most 50°, preferably at most 45°.

Preferably, said barium carbonate added in said step 2 has a particle size distribution such that in addition between 1% and 8% by weight of said barium carbonate passes through a 105 µm mesh sieve.

Preferably, said barium carbonate added in said step 2 has a particle size distribution such that in addition, less than 15% by weight of said barium carbonate passes through a 150 µm mesh sieve.

Preferably, said barium carbonate added in said step 2 may have a density of between 1.6 and 2.2 Kg/L.

Preferably, said barium carbonate is stored in at least one silo prior to said step 2.

In step 3, the method according to the invention comprises mixing said barium carbonate and said PA solution in said vessel.

The method according to the invention comprises, in step 4, removal from said at least one vessel of said PA solution formed during step 3 after a residence time of said PA solution in said at least one vessel of between 15 and 240 minutes; preferably between 20 and 120 minutes, more preferably between 25 and 90 minutes; more preferably between 30 and 60 minutes.

In particular, the residence time of said PA solution in a vessel may be determined by dividing the volume of said PA solution in said vessel by the volume flow rate of providing said PA solution in said PA solution.

This residence time allows to ensure a sufficient removal of $SO_3$ from said PA solution.

The method according to the invention comprises, in step 5, purification of said PA solution removed from said at least one vessel in step 4, by solvent extraction to obtain a purified PA solution.

In the field of phosphoric acid production and purification, a number of purification techniques using solvent extraction are known to those persons skilled in the art. Organic solvents or mixtures of organic solvents are generally used. Such organic solvents comprise, but are not limited to, isopropyl ether (including di-isopropyl ether), tri-n-butyl phosphate, methyl isobutyl ketone, butanol, isobutanol, isopropyl ether/tri-n-butyl phosphate mixtures, kerosene/hexanol mixtures and kerosene/butanol mixtures.

The purified PA solution obtained in step 5 comprises, relative to the total weight of said purified PA solution, preferably at most 0.002% by weight of $SO_3$, more preferably at most 0.0015% by weight of $SO_3$, more preferably at most 0.0010% by weight of $SO_3$, more preferably not more than 0.0009% by weight of $SO_3$, more preferably not more than 0.0005% by weight of $SO_3$, more preferably not more than 0.0002% by weight of $SO_3$, more preferably not more than 0.0001% by weight of $SO_3$ per percentage of $P_2O_5$ comprised in said purified PA solution.

For example, a purified PA solution comprising 61.5% by weight of $P_2O_5$ may comprise 10 to 1000 ppm of $SO_3$, preferably between 50 and 1000 ppm of $SO_3$, more preferably 50 to 750 ppm of $SO_3$, more preferably between 500 and 1000 ppm of $SO_3$. The method according to the present invention may further comprise a step of measuring the percentage by weight of $SO_3$ in said purified PA solution obtained in step 5. The percentage by weight of $SO_3$ may be measured by the $SO_3$ determination method described below. In particular, the percentage by weight of $SO_3$ in said purified PA solution may be measured several times throughout said method according to the invention. When it is observed that the amount of $SO_3$ increases or decreases in the purified PA solution, the amount of barium carbonate added in step 2 may be adapted so as to ensure that the percentage by weight of $SO_3$ in said purified PA solution is below a given value. The percentage by weight of barium carbonate may also be varied depending on the amount of sulphate removal desired.

Preferably, barium carbonate is added in step 2 in an amount sufficient for said purified PA solution obtained in step 5 preferably comprises at most 0.002% by weight of $SO_3$, more preferably at most 0.0015% by weight of $SO_3$, more preferably at most 0.0010% by weight of $SO_3$, more preferably not more than 0.0009% by weight of $SO_3$, more preferably not more than 0.0005% by weight of $SO_3$, more preferably not more than 0.0002% by weight of $SO_3$, more preferably not more than 0.0001% by weight of $SO_3$ per percent of $P_2O_5$ comprised in said purified PA solution.

Preferably, in step 2, between 0.001 and 0.012 g of barium carbonate are added with respect to each gram of $P_2O_5$ comprised in said purified PA solution obtained in step 5. Even more preferably, in step 2, between 0.002 and 0.008 g of barium carbonate are added with respect to each gram of $P_2O_5$ comprised in said purified PA solution obtained in step 5. Even more preferably, in step 2, between 0.003 and 0.005 g of barium carbonate are added with respect to each gram of $P_2O_5$ comprised in said purified PA solution obtained in step 5.

Method for Measuring the Percentage by Weight of $P_2O_5$

In the context of the present invention, the percentages by weight of $P_2O_5$ mentioned may be measured by the methods known to the person skilled in the art, in particular by colorimetry. More specifically, the colorimetric measurement may be carried out on a SKALAR spectrophotometer.

Method for Measuring the Percentage by Weight of $SO_3$

In the context of the present invention, the percentages by weight of $SO_3$ mentioned may be measured by the methods known to the person skilled in the art, in particular by turbidimetry. More specifically, the turbidimetry is measured using a Metrohm photometer, which measures the attenuation of the intensity of a light beam of known wavelength passing through the suspension.

A calibration with barium chloride solutions must be carried out.

Method for Measuring the Flodex Index

The flowability may be measured by the Flodex™ index, which is itself determined using a Flodex™ type system well known to the person skilled in the art. The Flodex index is a fluidity index based on an arbitrary scale from 4 to 40. The Flodex system comprises a container into which the powder (or the granules) to be tested is placed and the base of which consists of a diaphragm with a calibrated opening through which the flow of said powder is observed. Successive tests are used to determine the minimum diameter at which this powder flows freely. This diameter (in millimeters) corresponds to the Flodex™ index.

Method for Measuring the Angle of Repose

A defined volume of barium carbonate is collected and placed in a funnel placed above and in the center of a flat-bottomed cylinder. Once all the product has run out, the height in mm of the pyramid formed is measured. The angle at the base of the pyramid is measured using a trigonometric formula.

Example 1

An aqueous solution of phosphoric acid was purified by the method according to the invention. Phosphoric acid was derived from a wet-chemical production process that involved attacking a phosphate rock with sulphuric acid. The PA solution comprised, relative to the total weight of said PA solution, 60% by weight of $P_2O_5$ and 0.38% by weight of $SO_3$ before being provided in a vessel.

The PA solution was provided continuously in a vessel via the external conduit of a coaxial conduit comprising an internal conduit and an external conduit. The PA solution contained in the vessel had a temperature of 80° C. because it had been heated by a plate heat exchanger. Barium carbonate was previously stored in a silo and then added continuously to said vessel via the internal conduit of the same coaxial conduit used to provide said PA solution, simultaneously and continuously. The phosphoric acid flow leaving said external conduit formed an acid curtain, which reduced barium carbonate losses. Barium carbonate had the characteristics/properties shown in Table 1.

TABLE 1

| Barium carbonate | |
|---|---|
| Characteristics/properties | value |
| % by weight passing through a 45 μm mesh sieve | <1 |
| % by weight passing through a 63 μm mesh sieve | 1.1 |
| % by weight passing through a 75 μm mesh sieve | 1.2 |
| % by weight passing through a 105 μm mesh sieve | 5 |
| % by weight passing through a 150 μm mesh sieve | 6.3 |
| % by weight passing through a 250 μm mesh sieve | 9.5 |
| % by weight passing through a 500 μm mesh sieve | 39.6 |
| % by weight passing through a 1000 μm mesh sieve | >85 |
| Angle of repose (°) | 40 |
| Indice Flodex | 6 |
| Density (Kg/L) | 1.6-2.2 |

During the addition of the barium carbonate, the PA solution contained in said vessel, which had a temperature of 80° C., was mixed.

Said PA solution, which has been treated with $BaCO_3$, is removed from said vessel and then purified by extraction using an organic solvent.

Different purities were obtained depending on the residence time of the PA solution in said vessel, as summarized in Table 2.

TABLE 2

| Residence time | % by weight of $SO_3$ | % reduction in $SO_3$ |
|---|---|---|
| 15 minutes | 0.10 | 73.7 |
| 30 minutes | 0.07 | 81.5 |
| 60 minutes | 0.07 | 81.5 |

The percentage of $SO_3$ reduction is calculated as follows:

% reduction = 100 * (initial $SO_3$ − final $SO_3$)/inital $SO_3$ 0.012 g of barium carbonate were added per gram of $P_2O_5$ comprised in said purified PA solution obtained in step 5.

Said purified PA solution obtained in step 5 after solvent extraction comprises at most 0.0020% by weight of $SO_3$, per percent of $P_2O_5$ comprised in said purified PA solution. The particle size, the angle of repose, the flodex index, the weight percentages of $P_2O_5$ and $SO_3$ were measured as explained above.

From the results obtained, it is clear that the particle size of the barium carbonate allows short reaction times to be obtained, because after a residence time of just 15 minutes, more than 73% of the $SO_3$ has already been reduced. On the other hand, as shown in Table 1, the barium carbonate has an angle of repose of 400 and a flodex index of 6, indicating that the barium carbonate flows fluidly. This was confirmed during the implementation of the process, with no problems observed with the flow of barium carbonate, either in the silo or in the conduit used to add the barium carbonate. No formation of barium carbonate aggregates was observed.

Further tests were also carried out with 0.008 and 0.005 g of barium carbonate added per gram of $P_2O_5$ comprised in said purified PA solution obtained in step 5. These tests gave the same results as those shown in example 1.

Comparative Example

Example 1 was repeated identically with the exception of the added barium carbonate, the particle size of which was as shown in Table 3. In addition, the starting phosphoric acid contained 0.40% by weight of $SO_3$.

TABLE 3

| Barium carbonate | |
|---|---|
| Characteristics/properties | value |
| % by weight passing through a 45 µm mesh sieve | 95.5 |
| % by weight passing through a 63 µm mesh sieve | 96.7 |
| % by weight passing through a 75 µm mesh sieve | 97.6 |
| % by weight passing through a 105 µm mesh sieve | 98.9 |
| % by weight passing through a 150 µm mesh sieve | 99.9 |
| % by weight passing through a 250 µm mesh sieve | 100 |
| % by weight passing through a 500 µm mesh sieve | 100 |
| % by weight passing through a 1000 µm mesh sieve | 100 |
| Angle of repose (°) | 60 |
| Indice Flodex | 34 |

After a residence time of 15 minutes, 75% of the $SO_3$ had been reduced.

The particle size, the angle of repose, the flodex index, the weight percentages of $P_2O_5$ and $SO_3$ were measured as explained above.

On the other hand, it was observed that handling the $BaCO_3$ powder was made very difficult and that it did not flow easily out of the silo and into said internal conduit. This is confirmed by the angle of repose and flodex index measurements shown in Table 3.

The invention claimed is:

1. A method for purifying at least one aqueous solution of phosphoric acid continuously (hereinafter, PA solution) comprising at least the following steps:
    step 1: providing, in at least one vessel, at least one PA solution derived from at least one phosphoric acid obtained by a wet process for production of phosphoric acid, said PA solution having a temperature of between 65° C. and 98° C.; said PA solution comprising, before said step 1:
        between 50% and 63% by weight of $P_2O_5$ and
        between 0.15% and 0.6% by weight of $SO_3$ relative to the total weight of said PA solution;
    step 2: adding barium carbonate to said vessel; said barium carbonate having a particle size distribution such that:
        less than 1% by weight of said barium carbonate passes through a 45 µm mesh sieve;
        between 0% and 2% by weight, of said barium carbonate passes through a 63 µm mesh sieve;
        between 2 and 11% by weight of said barium carbonate passes through a 250 µm mesh sieve;
        between 25 and 60% by weight of said barium carbonate passes through a 500 µm mesh sieve;
        at least 85% by weight of said barium carbonate passes through a 1000 µm mesh sieve;
    step 3: mixing said barium carbonate and said PA solution in said vessel;
    step 4: removing from said vessel said PA solution formed during step 3 after a residence time of said PA solution in said at least one vessel of between 15 and 240 minutes;
    step 5: purifying said PA solution removed from said at least one vessel in step 4, by solvent extraction to obtain a purified PA solution.

2. The method according to claim 1, wherein said barium carbonate is added at said step 2 and said PA solution is provided at said step 1 by means of a coaxial conduit, comprising an internal conduit and an external conduit.

3. The method of claim 2, wherein said barium carbonate is added to said PA solution through said internal conduit and said PA solution is provided to said at least one vessel through said external conduit of said coaxial conduit.

4. The method according to claim 1, wherein said barium carbonate is added in said step 2 and said PA solution is provided in said step 1 simultaneously and continuously.

5. The method according to claim 1, wherein the barium carbonate added in step 2 has a density of between 1.6 and 2.2 Kg/L.

6. The method according to claim 1, wherein barium carbonate is added in step 2 in an amount sufficient for said purified PA solution obtained in step 5 to comprise at most 0.0020% by weight of $SO_3$, per percent of $P_2O_5$ comprised in said purified PA solution.

7. The method according to claim 1, wherein barium carbonate is added in step 2 in an amount sufficient for said purified PA solution obtained in step 5 to comprise at most 0.0015% by weight of $SO_3$ per percent of $P_2O_5$ comprised in said purified PA solution.

8. The method according to claim 1 wherein barium carbonate is added in step 2 in an amount sufficient for said purified PA solution obtained in step 5 to comprise at most 0.0010% by weight of $SO_3$, per percent of $P_2O_5$ comprised in said purified PA solution.

9. The method according to claim 1, wherein said residence time of said PA solution in said vessel is between 20 and 120 minutes.

10. The method according to claim 1, wherein between 0.001 and 0.012 g of barium carbonate are added with respect to each gram of $P_2O_5$ comprised in said purified PA solution obtained in step 5.

11. The method according to claim 1, wherein between 0.002 and 0.008 g of barium carbonate are added with respect to each gram of $P_2O_5$ comprised in said purified PA solution obtained in step 5.

12. The method according to claim 1, wherein between 0.003 and 0.005 g of barium carbonate are added with respect to each gram of $P_2O_5$ comprised in said purified PA solution obtained in step 5.

13. The method according to claim 1, wherein said PA solution comprises before said step 1 between 0.20% and 0.60% by weight of $SO_3$, relative to the total weight of said PA solution.

14. The method according to claim 1, wherein said PA solution comprises before said step 1 between 0.20 and 0.50% by weight of $SO_3$ relative to the total weight of said PA solution.

15. The method according to claim 1, wherein said barium carbonate added in step 2 has a particle size distribution such that between 1% and 2% by weight of said barium carbonate passes through a 63 μm mesh sieve.

16. The method according to claim 1, wherein said PA solution comprises, before said step 1, between 58% and 63% by weight of $P_2O_5$.

17. The method according to claim 1, wherein said barium carbonate added in step 2 has a particle size distribution such that between 30 and 55% by weight of said barium carbonate passes through a 500 μm mesh sieve.

18. The method according to claim 1, wherein said barium carbonate has a particle size distribution such that between 30 and 50% by weight of said barium carbonate passes through a 500 μm mesh sieve.

19. The method according to claim 1, wherein said barium carbonate added in step 2 has a particle size distribution such that between 30 and 45% by weight of said barium carbonate passes through a 500 μm mesh sieve.

20. The method according to claim 1, wherein said barium carbonate is added in step 2 in an amount sufficient for said purified PA solution obtained in step 5 to comprise at most 0.0001% by weight of $SO_3$ per percent of $P_2O_5$ comprised in said purified PA solution.

* * * * *